(12) United States Patent
Ji

(10) Patent No.: US 8,032,145 B2
(45) Date of Patent: Oct. 4, 2011

(54) RESTRICTIVE REUSE SET MANAGEMENT ALGORITHM FOR EQUAL GRADE OF SERVICE ON FL TRANSMISSION

(75) Inventor: Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 537 days.

(21) Appl. No.: 11/203,038

(22) Filed: Aug. 12, 2005

(65) Prior Publication Data
US 2006/0159004 A1    Jul. 20, 2006

Related U.S. Application Data

(63) Continuation-in-part of application No. 11/021,189, filed on Dec. 22, 2004, now Pat. No. 7,257,406.

(60) Provisional application No. 60/590,549, filed on Jul. 23, 2004.

(51) Int. Cl.
*H04W 72/00* (2009.01)

(52) U.S. Cl. ........ 455/450; 455/446; 455/447; 455/451; 455/452.1; 455/452.2; 455/453; 370/329; 370/330; 370/335; 370/336; 370/337; 370/252; 370/254; 370/342; 370/343; 370/347

(58) Field of Classification Search .................. 370/480, 370/329, 330, 335, 336, 337, 338, 342, 343, 370/344, 347, 341, 252, 254; 455/454, 447, 455/450, 451, 452.1, 452.2, 509, 45, 446, 455/448, 453
See application file for complete search history.

(56) References Cited

U.S. PATENT DOCUMENTS

| | | | |
|---|---|---|---|
| 4,639,914 A | 1/1987 | Winters et al. | |
| 5,038,399 A | 8/1991 | Bruckert et al. | |
| 5,210,771 A | 5/1993 | Schaeffer et al. | |
| 5,243,598 A | 9/1993 | Lee | |
| 5,355,522 A | 10/1994 | Demange et al. | |
| 5,497,505 A | 3/1996 | Koohgoli et al. | |
| 5,515,378 A | 5/1996 | Roy, III | |
| 5,649,292 A * | 7/1997 | Doner | 455/447 |
| 5,726,978 A | 3/1998 | Frodigh et al. | |
| 5,839,074 A | 11/1998 | Plehn et al. | |
| 5,850,605 A * | 12/1998 | Souissi et al. | 455/437 |
| 5,852,780 A | 12/1998 | Wang et al. | |

(Continued)

FOREIGN PATENT DOCUMENTS

EP    0658014 A1    6/1995
(Continued)

OTHER PUBLICATIONS

M.M. Matalgah, J. Qaddour, A. Sharma, K. Sheikh, Throughput na dSpectral Efficiency Analysis in 3G FDD WCDMA Cellular Systems, Dec. 1-5, 2003, IEEE Globecom '03, vol. 6, pp. 3423-3426.*

(Continued)

*Primary Examiner* — Olumide T Ajibade Akonai
(74) *Attorney, Agent, or Firm* — Donald C. Kordich

(57) ABSTRACT

Systems and methodologies are described that facilitate restrictive reuse resource set management with equal grade of service on forward link transmission. User throughput over a resource reuse set can be estimated, and an iterative method can be employed to reallocate users with poor spectral efficiency to reuse sets exhibiting high throughput to optimize overall throughput in a wireless network or a portion thereof.

53 Claims, 12 Drawing Sheets

U.S. PATENT DOCUMENTS

| | | | |
|---|---|---|---|
| 5,884,145 A | 3/1999 | Haartsen et al. | |
| 5,937,002 A | 8/1999 | Andersson et al. | |
| 5,937,003 A | 8/1999 | Sutterlin et al. | |
| 5,995,840 A * | 11/1999 | Dorenbosch et al. | 455/447 |
| 6,035,000 A | 3/2000 | Bingham et al. | |
| 6,055,432 A | 4/2000 | Haleem et al. | |
| 6,067,290 A | 5/2000 | Paulraj et al. | |
| 6,069,885 A * | 5/2000 | Fong et al. | 370/336 |
| 6,088,416 A * | 7/2000 | Perahia et al. | 375/377 |
| 6,112,074 A | 8/2000 | Pinder | |
| 6,112,094 A | 8/2000 | Dent et al. | |
| 6,223,041 B1 | 4/2001 | Egner et al. | |
| 6,356,531 B1 | 3/2002 | Soliman et al. | |
| 6,385,457 B1 | 5/2002 | Dam et al. | |
| 6,400,697 B1 * | 6/2002 | Leung et al. | 370/328 |
| 6,493,331 B1 | 12/2002 | Walton et al. | |
| 6,512,752 B1 * | 1/2003 | H'mimy et al. | 370/329 |
| 6,522,885 B1 * | 2/2003 | Tang et al. | 455/447 |
| 6,549,784 B1 | 4/2003 | Kostic et al. | |
| 6,553,234 B1 | 4/2003 | Florea et al. | |
| 6,591,106 B1 | 7/2003 | Zirwas et al. | |
| 6,606,496 B1 | 8/2003 | Salvarani et al. | |
| 6,643,277 B2 | 11/2003 | Garrison et al. | |
| 6,700,882 B1 * | 3/2004 | Lindoff et al. | 370/337 |
| 6,704,572 B1 | 3/2004 | Whinnett et al. | |
| 6,744,743 B2 | 6/2004 | Walton et al. | |
| 6,771,599 B1 | 8/2004 | Aoyama et al. | |
| 6,807,426 B2 | 10/2004 | Pankaj et al. | |
| 6,832,080 B1 | 12/2004 | Arslan et al. | |
| 6,870,808 B1 | 3/2005 | Liu et al. | |
| 6,871,073 B1 | 3/2005 | Boyer et al. | |
| 6,914,876 B2 | 7/2005 | Rotstein et al. | |
| 6,917,580 B2 * | 7/2005 | Wang et al. | 370/203 |
| 6,934,340 B1 | 8/2005 | Dollard et al. | |
| 6,947,748 B2 | 9/2005 | Li et al. | |
| 6,990,348 B1 | 1/2006 | Benveniste et al. | |
| 6,990,349 B1 | 1/2006 | Idrissi et al. | |
| 6,993,002 B2 | 1/2006 | Pan et al. | |
| 6,993,006 B2 | 1/2006 | Pankaj et al. | |
| 6,993,339 B2 * | 1/2006 | Skillermark et al. | 455/447 |
| 6,996,056 B2 * | 2/2006 | Chheda et al. | 370/209 |
| 7,006,466 B2 | 2/2006 | Borst et al. | |
| 7,042,856 B2 | 5/2006 | Walton et al. | |
| 7,046,654 B2 | 5/2006 | Chen et al. | |
| 7,054,308 B1 | 5/2006 | Conway et al. | |
| 7,062,276 B2 | 6/2006 | Xu et al. | |
| 7,076,637 B2 | 7/2006 | Kelley et al. | |
| 7,099,678 B2 | 8/2006 | Vaidyanathan et al. | |
| 7,133,680 B2 | 11/2006 | Crisan et al. | |
| 7,146,172 B2 | 12/2006 | Li et al. | |
| 7,151,755 B2 | 12/2006 | Xu et al. | |
| 7,151,756 B1 | 12/2006 | Park et al. | |
| 7,197,316 B2 | 3/2007 | Karger et al. | |
| 7,209,712 B2 | 4/2007 | Holtzman | |
| 7,221,653 B2 | 5/2007 | Vanghi et al. | |
| 7,230,942 B2 | 6/2007 | Laroia et al. | |
| 7,242,958 B2 | 7/2007 | Chung et al. | |
| 7,257,410 B2 | 8/2007 | Chun et al. | |
| 7,260,077 B2 | 8/2007 | Wu et al. | |
| 7,272,110 B2 * | 9/2007 | Lee et al. | 370/209 |
| 7,295,513 B2 | 11/2007 | Elliott et al. | |
| 7,321,772 B2 | 1/2008 | Morimoto et al. | |
| 7,352,819 B2 | 4/2008 | Lakshmipathi et al. | |
| 7,366,202 B2 | 4/2008 | Scherzer et al. | |
| 7,392,054 B2 | 6/2008 | Cho et al. | |
| 7,437,182 B2 | 10/2008 | Lee et al. | |
| 7,603,127 B2 * | 10/2009 | Chung et al. | 455/453 |
| 2002/0061007 A1 | 5/2002 | Pankaj et al. | |
| 2002/0119781 A1 | 8/2002 | Li et al. | |
| 2002/0147017 A1 | 10/2002 | Li et al. | |
| 2002/0159405 A1 | 10/2002 | Garrison et al. | |
| 2002/0197999 A1 * | 12/2002 | Wu et al. | 455/452 |
| 2003/0031130 A1 | 2/2003 | Vanghi et al. | |
| 2003/0050067 A1 | 3/2003 | Rozmaryn et al. | |
| 2003/0096618 A1 | 5/2003 | Palenius | |
| 2003/0123425 A1 | 7/2003 | Walton et al. | |
| 2003/0125040 A1 * | 7/2003 | Walton et al. | 455/454 |
| 2003/0134639 A1 | 7/2003 | Karger | |
| 2003/0176192 A1 | 9/2003 | Morimoto et al. | |
| 2003/0227889 A1 | 12/2003 | Wu et al. | |
| 2004/0081121 A1 | 4/2004 | Xu et al. | |
| 2004/0114621 A1 | 6/2004 | Rotstein et al. | |
| 2004/0209579 A1 | 10/2004 | Vaidyanathan et al. | |
| 2004/0209619 A1 | 10/2004 | Crisan et al. | |
| 2005/0048979 A1 | 3/2005 | Chun et al. | |
| 2005/0063389 A1 | 3/2005 | Elliott et al. | |
| 2005/0073973 A1 | 4/2005 | Laroia et al. | |
| 2005/0096061 A1 | 5/2005 | Ji et al. | |
| 2005/0096062 A1 | 5/2005 | Ji et al. | |
| 2005/0122999 A1 * | 6/2005 | Scherzer et al. | 370/480 |
| 2005/0141624 A1 | 6/2005 | Lakshmipathi et al. | |
| 2005/0181833 A1 | 8/2005 | Lee et al. | |
| 2005/0237971 A1 | 10/2005 | Skraparlis et al. | |
| 2005/0282550 A1 | 12/2005 | Cho et al. | |
| 2006/0002360 A1 | 1/2006 | Ji et al. | |
| 2006/0003794 A1 * | 1/2006 | Chung et al. | 455/522 |
| 2006/0019701 A1 | 1/2006 | Ji | |
| 2006/0023745 A1 | 2/2006 | Koo et al. | |
| 2006/0120478 A1 | 6/2006 | Kim et al. | |
| 2006/0188044 A1 | 8/2006 | Wang et al. | |
| 2007/0004419 A1 | 1/2007 | Ji et al. | |
| 2008/0253319 A1 | 10/2008 | Ji et al. | |

FOREIGN PATENT DOCUMENTS

| | | |
|---|---|---|
| EP | 1178641 A1 | 2/2002 |
| EP | 1473886 A2 | 11/2004 |
| GB | 2313742 A | 12/1997 |
| JP | 06-204938 | 7/1994 |
| JP | 2003018081 A | 1/2003 |
| JP | 2003018091 A | 1/2003 |
| JP | 2003153335 A | 5/2003 |
| JP | 2003304574 | 10/2003 |
| JP | 20030530009 | 10/2003 |
| JP | 2004208234 A | 7/2004 |
| JP | 2004254204 A | 9/2004 |
| JP | 2004533750 | 11/2004 |
| WO | WO9602979 A2 | 2/1996 |
| WO | WO9607288 A1 | 3/1996 |
| WO | WO9701256 A1 | 1/1997 |
| WO | WO9746044 A1 | 12/1997 |
| WO | WO9749258 A1 | 12/1997 |
| WO | WO0059251 A1 | 10/2000 |
| WO | 01/76098 A2 | 10/2001 |
| WO | WO0233648 A1 | 4/2002 |
| WO | WO0233848 A2 | 4/2002 |
| WO | WO0249385 A2 | 6/2002 |
| WO | WO03005674 A1 | 1/2003 |
| WO | WO03052964 A1 | 6/2003 |
| WO | WO2005043948 A2 | 5/2005 |
| WO | WO2005125263 A1 | 12/2005 |

OTHER PUBLICATIONS

Office Action issued in related U.S. Appl. No. 10/858,870 mailed Apr. 2, 2007.

Office Action issued in related U.S. Appl. No. 10/858,870 mailed Sep. 27, 2007.

Office Action issued in related U.S. Appl. No. 10/871,084 mailed Jul. 31, 2006.

Zhang et al., "Enhanced feedback method for enhanced fast-feedback channels", IEEE 802.16 Broadband Wireless Access Working Group, (Online) pp. 1-9 (Nov. 15, 2004).

International Search Report and Written Opinion—PCT/US06/031403, International Search Authority—European Patent Office. Jan. 2, 2007.

Taiwanese Search Report—TW095129639—Search Authority—TIPO—Jun. 5, 2009.

Bender, P. at al., "CDMA/HDR: A Bandwidth-Efficient High-speed Wireless Data Service for Nomadic Users" IEEE Communications Magazine, IEEE Service Center, Piscataway, US, vol. 38, No. 7, Jul. 1, 2000, pp. 70-77, XP01109318.

Taiwan Search Report—TW093132833—TIPO—Apr. 4, 2011.

Taiwan Search Report—TW093133004—TIPO—May 26, 2011.

* cited by examiner

FIG. 1

| | $U_0$ | $U_1$ | $U_2$ | $U_3$ | $U_4$ | $U_5$ | $U_6$ |
|---|---|---|---|---|---|---|---|
| | 111 | 110 | 101 | 011 | 100 | 010 | 001 |
| Sector 0 | ✓ | ✓ | ✓ | ✗ | ✓ | ✗ | ✗ |
| Sector 1 | ✓ | ✓ | ✗ | ✓ | ✗ | ✓ | ✗ |
| Sector 2 | ✓ | ✗ | ✓ | ✓ | ✗ | ✗ | ✓ |

RESTRICTIVE REUSE SET MANAGEMENT ALGORITHM FOR EQUAL GRADE OF SERVICE ON FL TRANSMISSION

CLAIM OF PRIORITY UNDER 35 U.S.C. §120

The present Application for Patent is a continuation-in-part of patent application Ser. No. 11/021,189 entitled "RESTRICTIVE REUSE SET MANAGEMENT" filed Dec. 22, 2004, issued as U.S. Pat. No. 7,257,406 on Aug. 14, 2007, and assigned to the assignee hereof and hereby expressly incorporated by reference herein which claims priority to patent application Ser. No. 60/590,549 entitled "RESTRICTIVE REUSE SET MANAGEMENT" filed Jul. 23, 2004.

BACKGROUND

I. Field

The following description relates generally to wireless communications, and more particularly to improving mobile device throughput by dynamically reassigning mobile devices among orthogonal resource reuse sets.

II. Background

Wireless networking systems have become a prevalent means by which a majority of people worldwide has come to communicate. Wireless communication devices have become smaller and more powerful in order to meet consumer needs and to improve portability and convenience. The increase in processing power in mobile devices such as cellular telephones has lead to an increase in demands on wireless network transmission systems. Such systems typically are not as easily updated as the cellular devices that communicate there over. As mobile device capabilities expand, it can be difficult to maintain an older wireless network system in a manner that facilitates fully exploiting new and improved wireless device capabilities.

More particularly, frequency division based techniques typically separate the spectrum into distinct channels by splitting it into uniform chunks of bandwidth, for example, division of the frequency band allocated for wireless cellular telephone communication can be split into 30 channels, each of which can carry a voice conversation or, with digital service, carry digital data. Each channel can be assigned to only one user at a time. One commonly utilized variant is an orthogonal frequency division technique that effectively partitions the overall system bandwidth into multiple orthogonal subbands. These subbands are also referred to as tones, carriers, subcarriers, bins, and frequency channels. Each subband is associated with a subcarrier that can be modulated with data. With time division based techniques, a band is split time-wise into sequential time slices or time slots. Each user of a channel is provided with a time slice for transmitting and receiving information in a round-robin manner. For example, at any given time t, a user is provided access to the channel for a short burst. Then, access switches to another user who is provided with a short burst of time for transmitting and receiving information. The cycle of "taking turns" continues, and eventually each user is provided with multiple transmission and reception bursts.

Code division based techniques typically transmit data over a number of frequencies available at any time in a range. In general, data is digitized and spread over available bandwidth, wherein multiple users can be overlaid on the channel and respective users can be assigned a unique sequence code. Users can transmit in the same wide-band chunk of spectrum, wherein each user's signal is spread over the entire bandwidth by its respective unique spreading code. This technique can provide for sharing, wherein one or more users can concurrently transmit and receive. Such sharing can be achieved through spread spectrum digital modulation, wherein a user's stream of bits is encoded and spread across a very wide channel in a pseudo-random fashion. The receiver is designed to recognize the associated unique sequence code and undo the randomization in order to collect the bits for a particular user in a coherent manner.

A typical wireless communication network (e.g., employing frequency, time, and code division techniques) includes one or more base stations that provide a coverage area and one or more mobile (e.g., wireless) terminals that can transmit and receive data within the coverage area. A typical base station can simultaneously transmit multiple data streams for broadcast, multicast, and/or unicast services, wherein a data stream is a stream of data that can be of independent reception interest to a mobile terminal. A mobile terminal within the coverage area of that base station can be interested in receiving one, more than one or all the data streams carried by the composite stream. Likewise, a mobile terminal can transmit data to the base station or another mobile terminal. Such communication between base station and mobile terminal or between mobile terminals can be degraded due to channel variations and/or interference power variations. For example, the aforementioned variations can affect base station scheduling, power control and/or rate prediction for one or more mobile terminals.

Restrictive reuse is a technique designed to reduce inter-cell interference in wireless communication systems. Restrictive reuse is a global planning scheme that takes into account the channel and interference measured by users of a wireless network. Restrictive reuse seeks to reuse orthogonal resources (such as frequencies, time, codes, beams, spatial dimensions, etc.) for selected users based on channel quality associated therewith. In view of at least the above, there exists a need in the art for a system and/or methodology of improving wireless communication and orthogonal resource allocation to user devices in a wireless network environment to improve user device throughput.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with improving user device throughput in a wireless network environment. According to one aspect, a restrictive reuse set management algorithm for equal grade of service on forward link transmission is provided. The algorithm can improve the signal-to-interference and noise ration (SINR) of weak users in interference-limited networks. Bandwidth allocated to each reuse set, reuse set loading and the harmonic mean of the spectral efficiencies of all users sharing the reuse set, can be employed to estimate the equal grade of service (EGoS) user throughput over the reuse set. An iterative algorithm can then be utilized to maximize sector throughput under the constraint of equal user throughput over all reuse sets.

In this document, frequency sets will be used as an example of orthogonal resource sets to explain the restrictive reuse set management algorithm. Such algorithm is directly applicable to other embodiments of orthogonal resources, such as time slots, carriers, codes, spatial dimension, frequency/time interlaces and beam-forming beams.

According to an aspect, a method of optimizing signal transmission throughput in a wireless network can comprise approximating aggregated throughput of frequency reuse sets, employing one or more EGoS schedulers to enforce fairness constraints for resource allocation to at least one user device within each resource reuse set, and employing a restrictive reuse set management algorithm to enforce fairness constraints for resource allocation between resource reuse sets. The method can further comprise identifying user devices with poor connections due to low spectral efficiency, and reassigning such devices to resource sets exhibiting high throughput to improve overall network throughput.

According to another aspect, a system that facilitates optimizing user device throughput in a wireless network environment can comprise a restrictive reuse component that assesses spectral efficiency of user devices in a wireless network and enforces fairness constraints between resource reuse sets, and one or more equal grade of service (EGoS) schedulers that enforce fairness constraints within the resource reuse sets. The system can further comprise an assignment component that facilitates generating initial assignments of devices to resource reuse sets, as well as device reassignments to optimize throughput.

According to another aspect, an apparatus that facilitates improving spectral efficiency of user devices in a wireless network can comprise means for enforcing fairness constraints related to resource allocation to user devices within a resource reuse set in a wireless network, and means for enforcing fairness constraints related to resource allocation to one or more resource reuse sets in the wireless network. The apparatus can additionally comprise means for assigning user devices to a resource reuse set, means for evaluating spectral efficiency of one or more user devices, and means for identifying a resource reuse set in which a user device can experience improved spectral efficiency. The means for assigning can reassign a user device with low spectral efficiency to the identified resource reuse set to improve the spectral efficiency of the reassigned user device.

Yet another aspect provides for a computer-readable medium having stored thereon computer-executable instructions for distributing resources to one or more user devices associated with a resource reuse set according to an equal grade of service protocol, and for managing resource reuse sets in a wireless network. The computer-readable medium can additionally comprise instructions for evaluating spectral efficiency for at least one user device in the wireless network, instructions for identifying a user device having a lowest spectral efficiency relative to all other user devices, instructions for identifying an resource set with a highest overall throughput relative to other resource sets in the wireless network, and instructions for reassigning the user device with lowest spectral efficiency to the resource set with highest overall throughput to improve spectral efficiency of the user device.

Still another aspect relates to a microprocessor that executes instructions for optimizing throughput in a wireless communication environment, the instructions comprising: assessing throughput for one or more user devices in communicating in at least a portion of a wireless network; evaluating sector throughput for one or more orthogonal resource sets in the portion of the wireless network; identifying a user device with relatively low throughput compared to other user devices; and reassigning the user device from a first orthogonal resource set to an second orthogonal resource of higher throughput than the first orthogonal resource set.

According to another aspect, a mobile device can comprise a component that receives an orthogonal resource set assignment; and a component that establishes control over resources allocated by the orthogonal resource set assignment. The received assignment can be a reassignment to a higher-throughput orthogonal resource set, as set forth with regard to various embodiments described herein. The mobile device can be, for example, a cellular phone, a smart phone, a laptop, a PDA, a handheld communication device, a handheld computing device, etc.

To the accomplishment of the foregoing and related ends, the one or more embodiments comprises the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

BRIEF DESCRIPTION OF THE DRAWINGS

FIG. 1 illustrates a table that facilitates an understanding of to active set based restricted reuse resource hopping and resource allocation with regard thereto, in accordance with various aspects.

DETAILED DESCRIPTION

Figure 2:
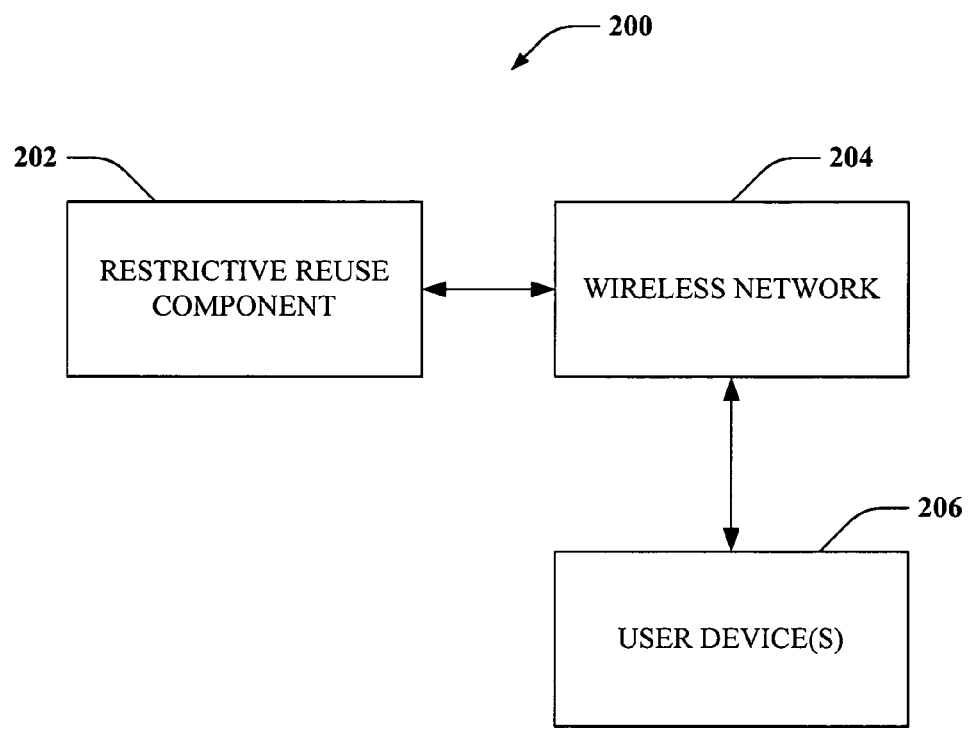
FIG. 2 is an illustration of a system that facilitates assigning user devices to resource reuse sets to maximize sector throughput utilizing an EGoS fairness constraint, in accordance with various aspects.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. One or more components may reside within a process and/or thread of execution and a component may be localized on one computer and/or distributed between two or more computers. Also, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a subscriber station. A subscriber station can also be called a system, a subscriber unit, mobile station, mobile, remote station, access point, base station, remote terminal, access terminal, user terminal, user agent, or user equipment. A subscriber station may be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ).

Referring now to the drawings, FIG. 1 illustrates a diagram 100 that facilitates understanding of restrictive reuse of orthogonal resources such as frequencies, bandwidth, time slots, carriers, etc., and resource allocation with regard thereto. An aspect of resource reuse management is to intelligently deploy, for example, frequency for reuse by selected users based the users' channel qualities. With regard to CDMA systems, an "active set" can be defined for each user for handoff purposes. Sectors in the active set of a user usually contribute interference to the user's reception on the forward link (FL), while sector transmissions are interfered with by the user's transmission on a reverse link (RL). By avoiding interference from various sectors in a user's active set, reduced interference on both FL and RL can be achieved. Simulations and analysis have shown that the frequency reuse assignment algorithm based on a user's active set yields a 3.5 dB signal-to-interference and noise ratio (SINR) improvement with 25% bandwidth partial loading.

Schedulers in wireless networks can be modified, according to various embodiments described herein, to take advantage of the SINR improvement through orthogonal resource set reuse. When dealing with voice transmission traffic, voice capacity is often limited by the SINR of the worst users in a network. Because a voice user will occupy some narrow portion of available bandwidth for a relatively long duration, a capacity improvement can be achieved by assigning a static frequency reuse set to the user to improve the user SINR throughout the duration of a call. However, in the case of data traffic, conventional static reuse algorithms are not flexible enough to accommodate "bursty" data traffic (e.g., traffic that is intermittent, etc.) and/or traffic of varying fairness requirements. When a user transmits/receives bursty traffic, conventional systems require a tradeoff to be made among frequency sets that have different SINR, available bandwidth, and offered load (e.g., from other users on a given reuse set). A scheduler can be further complicated if fairness criteria such as equal grade of service (EGoS) or proportional fairness need to be enforced for users of different reuse sets.

Diagram 100 illustrates a simplified scenario in which communication bandwidth is divided into seven frequencies, $U_0$ through $U_6$, which can be assigned to various sectors, over which the sectors can transmit and receive information. In the following exemplary resource reuse algorithm, each sector is assigned a value of 0, 1, or 2. The overall bandwidth available in a network is divided into 7 frequency sets with universal reuse, ⅓ reuse and ⅔ reuse. Each reuse resource set can then be labeled with a 3-bit binary mask, where a "1" at the $i^{th}$ position indicates that it is used by sectors of value i. For example, "110" indicates a ⅔ frequency reuse set that is used by sectors of values 0 and 1 but not sectors of value 2. The labels of frequency sets $\{U_0, U_1, U_2, U_3, U_4, U_5, U_6\}$ are given by $\{111, 110, 101, 011, 100, 010, 001\}$. However, it will be appreciated that other labeling conventions are possible. For instance, the value of the three-bit mask can be employed to label the frequency set (e.g., wherein 111 denotes frequency set 7, 001 denotes frequency set 1, etc.). With frequency planning, users can avoid dominant interferers by using a ⅓ or ⅔ reuse frequency set.

In third-generation networks, the fairness among data users can be enforced by the scheduler. In a network where the forward link transmissions to users are time multiplexed, the user with the highest scheduling metric is typically scheduled for transmission over the scheduling time slot. The scheduling metric is usually computed based not only on a fairness metric but also on channel desirability, to take advantage of the multi-user diversity (MUD). For example, let $\lambda_i$ denote the throughput of user i over a specified window, and let $\mu_i$ and $\bar{\mu}_i$ denote the instant and average spectral efficiency of user I, respectively. The fairness metric $F_i$ is given by:

$$F_i = \frac{1}{\lambda_i}, \tag{1}$$

for an EGoS scheduler, and $$F_i = \frac{\bar{\mu}_i}{\lambda_i}, \quad (2)$$

for a proportional fair scheduler. The channel desirability metric is given by:

$$T_i = \frac{\mu_i}{\bar{\mu}_i}. \quad (3)$$

The scheduling metric can be calculated as the output of a metric combining function of the fairness metric, and the channel desirability metric. The scheduling metric and be further combined with other QoS related metric $Q_i$ to make the final scheduling decision. In this invention, only fairness metric is used to illustrated the flexibility of the dynamic restricted reuse scheduler. In one embodiment, the combining function is a product as given by:

$$S_i = F_i T_i. \quad (4)$$

In another embodiment, the function is a product of the each metric raised by some exponents α and β as given by:

$$S_i = F_i^\alpha T_i^\beta. \quad (5)$$

In yet another embodiment, the function is a weighted sum of each metric raised by some exponents α and β as given by:

$$S_i = aF_i^\alpha + bT_i^\beta. \quad (6)$$

In yet another embodiment, the function is the maximum of the weighted metric raised by some exponents α and β as given by:

$$S_i = \max(aF_i^\alpha, bT_i^\beta). \quad (7)$$

FIG. 2 is an illustration of a system 200 that facilitates assigning user devices to orthogonal resource reuse sets to maximize sector throughput utilizing an EGoS fairness constraint. Conventional resource reuse systems can cause fairness problems when a reuse set is assigned based solely on SINR characteristics of a user device without considering reuse set bandwidth and/or reuse set loading. System 200 comprises an restrictive reuse component 202 that is operatively coupled to a wireless network 204 and one or more user devices 206. Wireless network 204 can comprise, for example, a plurality of base stations, sectors, regions, and the like, as will be appreciated by one skilled in the art. User device(s) 206 can comprise, without being limited to, a cellular phone, a smart phone, a PDA, a laptop, a personal computing device, a handheld communication device, a satellite radio, a global positioning system, and/or any other device suitable for receiving and/or transmitting information over wireless network 204.

Additionally, wireless network 204 can provide communication service to user devices 206 in conjunction with a variety of multiple access techniques, a combination thereof, or any other suitable wireless communication protocol, as will be appreciated by one skilled in the art. For example, these techniques can be employed in conjunction with a code division multiple access (CDMA) system, a frequency division multiple access (FDMA) system, a time division multiple access (TDMA) system, an orthogonal frequency division multiple access (OFDMA) system, an interleaved (IFDMA) system, a localized FDMA (LFDMA) system, a spatial division multiple access (SDMA) system, a quasi-orthogonal multiple-access system, and so on. IFDMA is also called distributed FDMA, and LFDMA is also called narrowband FDMA or classical FDMA. An OFDMA system utilizes orthogonal frequency division multiplexing (OFDM). OFDM, IFDMA, and LFDMA effectively partition the overall system bandwidth into multiple (K) orthogonal frequency subbands. These subbands are also called tones, subcarriers, bins, and so on. Each subband is associated with a respective subcarrier that can be modulated with data. OFDM transmits modulation symbols in the frequency domain on all or a subset of the K subbands. IFDMA transmits modulation symbols in the time domain on subbands that are uniformly distributed across the K subbands. LFDMA transmits modulation symbols in the time domain and typically on adjacent subbands.

For instance, when a user device 206 is assigned a reuse ⅓ or ⅔ reuse set, such user device 206 can experience a level of interference that is significantly lower than is experienced under an assignment to a universal reuse set. When employing an EGoS fairness criterion, it can be desirable to equalize the SINR among all users devices 206 by assigning weaker user devices to ⅓ or ⅔ reuse sets. User device 206 throughput performance can also depend on bandwidth allocation to each user device 206 within a reuse set. Accordingly, one or more EGoS schedulers can be employed by restrictive reuse component 202 to ensure fairness within a reuse set, while restrictive reuse component 202 can employ a set management algorithm to ensure fairness between reuse sets.

For the remainder of this document, various embodiments of the restricted reuse component, where the orthogonal resource sets are frequency sets, will be explained for ease of understanding. However, it is to be understood that resource sets are not limited to comprising only frequencies, but rather can comprise frequency sets, time slot sets, frequency-and-time slot sets, code sets, orthogonal space-division multiple access (SDMA) dimensions, and carrier sets, OFDMA subcarrier sets, IFDMA subcarrier sets, LFDMA subcarrier sets, and/or any other suitable resources.

Figure 3:
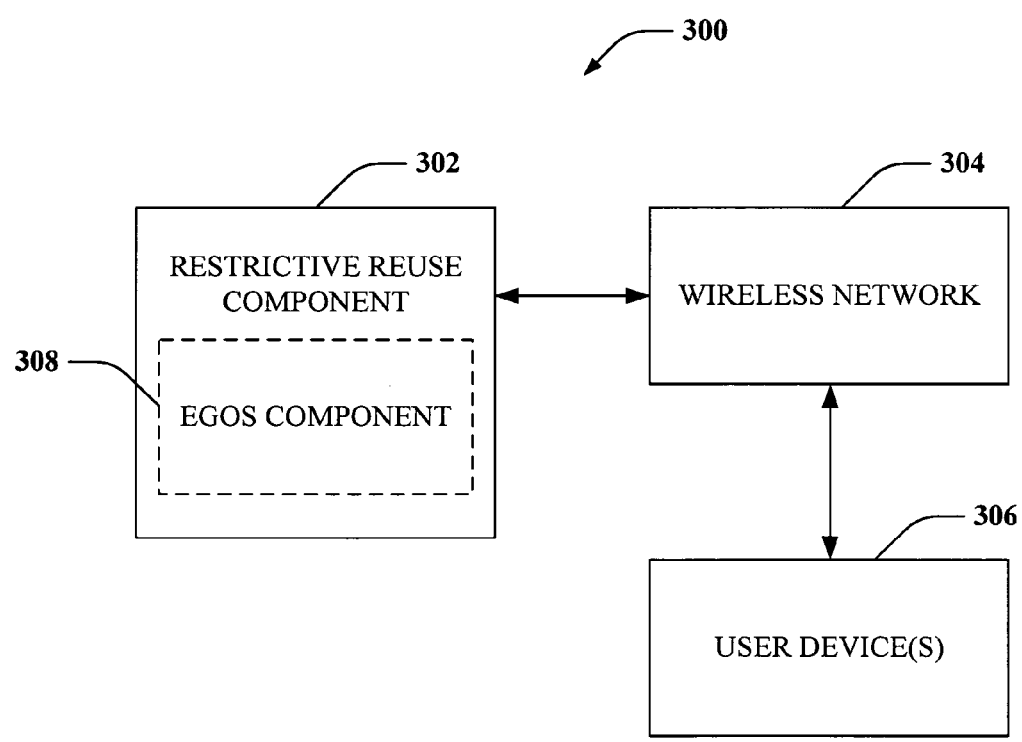
FIG. 3 is an illustration of a system that facilitates maximizing user device throughput under an EGoS fairness constraint in accordance with one or more embodiments.

FIG. 3 is an illustration of a system 300 that facilitates maximizing user device throughput under an EGoS fairness constraint in accordance with one or more embodiments. System 300 comprises a restrictive reuse component 302 that can assign user devices 306 to a frequency reuse set to maximize throughput of user devices 306 when communicating over a wireless network 306. Restrictive reuse component comprises an EGoS component that enforces EGoS constraints with regard to user devices 306 assigned to a reuse set in order to ensure fairness within each reuse set.

EGoS component can assess user device 306 throughput to determine an appropriate reuse set to which a given user device 306 can be assigned in order to improve throughput for the user device 306, which in turn improves overall efficiency of wireless network 304. For example, let $\lambda_i$ denote the throughput of user device i over a specified window, and let $\mu_i$ and $\bar{\mu}_i$ denote the instant and average spectral efficiency of user device I, respectively. The fairness metric $F_i$ can be given by:

$$F_i = \frac{1}{\lambda_i}, \quad (1)$$

as described above.

Once a fairness metric has been evaluated for user devices 306, restrictive reuse component 302 can proceed to allocate user devices 306 to appropriate frequency reuse sets in order to facilitate improving throughput. For example, restrictive reuse component 302 can determine a channel desirability metric for each user device 306 in order to evaluate a scheduling metric to assist in reuse set assignment. The channel desirability metric is given by:

$$T_i = \frac{\mu_i}{\bar{\mu}_i}. \tag{3}$$

The scheduling metric for each user device 306 can then be calculated by restrictive reuse component 302 as the product of the fairness metric $F_i$ and the channel desirability metric $T_i$, such that:

$$S_i = F_i T_i. \tag{4}$$

It will be appreciated that other functions describing the scheduling metric can be employed as well, such as set forth with regard to equations (5)-(7) above.

Figure 4:
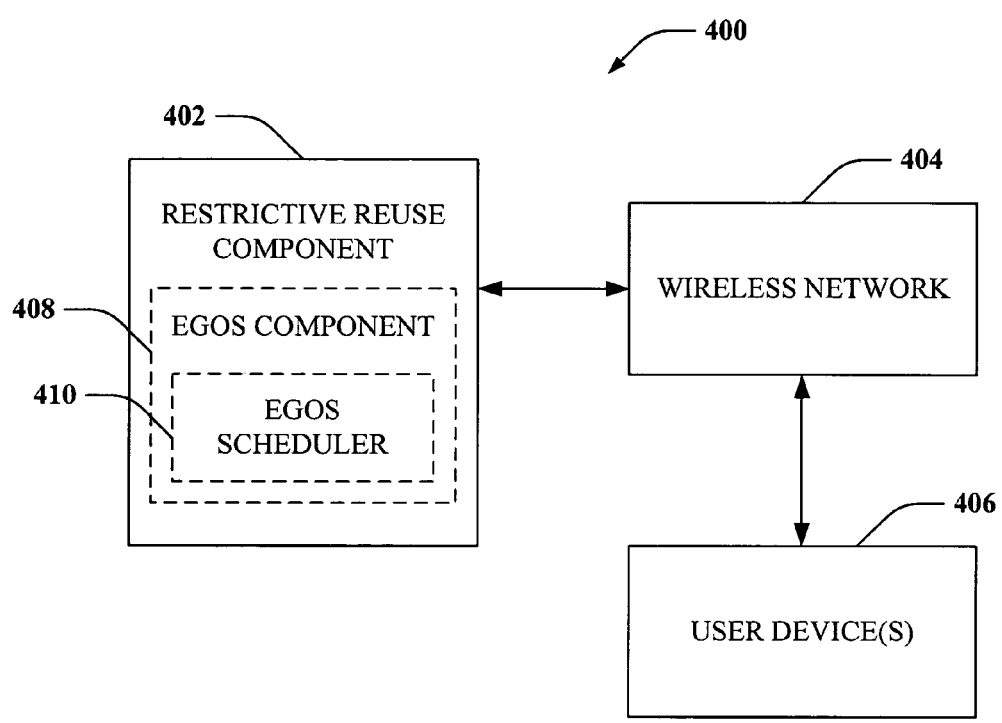
FIG. 4 illustrates a system that facilitates user device throughput optimization utilizing EGoS schedulers such that each frequency reuse set is governed by an EGoS scheduler, in accordance with various aspects.

FIG. 4 illustrates a system 400 that facilitates user device throughput optimization utilizing EGoS schedulers such that each frequency reuse set is governed by an EGoS scheduler. System 400 comprises a restrictive reuse component 402 that is operatively associated with a wireless network 404 over which one or more user devices 406 can communicate. Wireless network 404 can comprise, for example, a plurality of base stations in sectors, regions, and the like, each of which transmits and receives communication signals to and from other base stations and/or user devices 406, as will be appreciated by one skilled in the art. User device(s) 406 can comprise, without being limited to, cellular phones, smart phones, PDAs, laptops, personal computing devices, handheld communication devices, satellite radios, global positioning systems, and/or any other device suitable for receiving and/or transmitting information over wireless network 404.

Restrictive reuse component 402 comprises an EGoS component 408 that enforces EGoS fairness constraints during frequency reuse set assignment. EGoS component 408 further comprises one or more EGoS schedulers 410, each of which is responsible for a single frequency reuse set and determines a fairness metric for user devices 406 assigned thereto. EGoS component 408, in conjunction with EGoS schedulers 410 can determine an aggregated reuse set throughput approximation for fairness among user devices 406 by evaluating a product of the harmonic mean of user device spectral efficiency and bandwidth of a given reuse set. A separate EGoS scheduler 410 can be implemented over each reuse set, and equal grade of service among users of the same reuse set can be achieved through the EGoS algorithm as described by (1), (3) and (4), where $\mu_n$ is replaced by $\mu_{n,m}$, described below, for reuse set m. Equal grade of service among different reuse sets can be achieved through the reuse set management algorithm as described herein.

For example, given N active users and M non-forbidden (e.g., available) reuse sets in a sector, let $\mu_{u,m}$ denote the spectral efficiency of user n over reuse set m. Let $S_m$ denote the set of users assigned to reuse set m, where set 0 denotes a 1/1 reuse set, and let $B_m$ denote the bandwidth of reuse set m. EGoS sector throughput can be approximated by:

$$B_m \frac{|S_m|}{\sum_{i \in S_m} 1/\mu_{i,m}},$$

where |.| denotes the size of a set. Estimated user device 406 throughput over reuse set m can be given by:

$$\eta_m = \frac{B_m}{\sum_{i \in S_m} 1/\mu_{i,m}}. \tag{8}$$

Reuse set memberships can then be allocated to user devices 406 by restrictive reuse component 402 to maximize sector throughput under the constraint that a substantially similar user device throughput is to be achieved over all reuse sets. In this manner, system 400 can facilitate optimizing user device 406 throughput in wireless network 404 in order to provide a more robust communication experience for users of user devices 406 while mitigating transmission costs and taxation of system resources when providing frequency allocation to such user devices 406.

Figure 5:
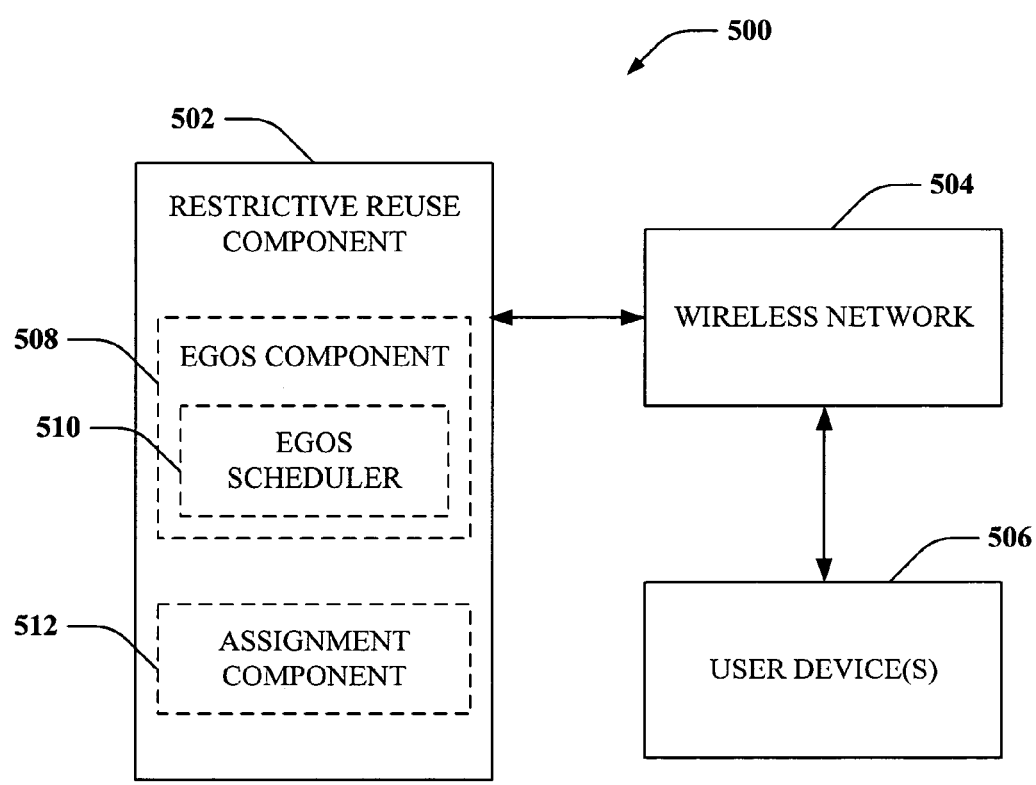
FIG. 5 is an illustration of a system that facilitates optimizing user device throughput in a wireless network employing EGoS constraints to ensure that user device throughput is substantially equalized over a plurality of resource reuse sets, in accordance with various aspects.

FIG. 5 is an illustration of a system 500 that facilitates optimizing user device throughput in a wireless network employing EGoS constraints to ensure that user device throughput is substantially equalized over a plurality of frequency reuse sets. System 500 comprises a restrictive reuse component 502 that optimizes frequency allocation over a wireless network 504 to user devices 506. Restrictive reuse component 502 can comprise an EGoS component 508 having one or more EGoS schedulers 510, and an assignment component 512 that assigns and/or reassigns user devices 506 to frequency reuse sets to ensure that user devices 506 experience substantially equal grades of service over all frequency reuse sets employed in wireless network 504.

According to an aspect, restrictive reuse component 502, in conjunction with one or more components comprised there by, can employ a reuse set management algorithm to optimize user through put. For example, restrictive reuse component 502 can compute $\mu_{n,m}$ for n=[1 ... N] and m=[1 ... M], where n is the number of active user devices 506 and m is the number of available reuse sets in a sector of wireless network 504. Restrictive reuse component 502 can then initialize frequency reuse set $S_0$ with the set {1 ... N} and initialize other $S_m$'s with empty sets. Restrictive reuse component 502, in conjunction with assignment component 512, can move the weakest M−1 connections (e.g., connections with the smallest spectral efficiency $\mu_{n,0}$) from reuse set $S_0$ to the other M−1 reuse sets, such that each reuse set has only one connection (e.g., user device 506). Estimated user device 506 throughput can be computed by Restrictive reuse component 502 using the equation:

$$\eta_m = \frac{B_m}{\sum_{i \in S_m} 1/\mu_{i,m}}., \tag{8}$$

wherein an independent EGoS scheduler 510 is implemented over each reuse set, as set forth with regard to this and the preceding figures.

A series of assumptions can then be made to improve user device 506 throughput. For example, let $m_w$ denote the index of the reuse set with the lowest user device throughput, $\eta_m$. Let $n_w$ denote the index of the weakest user device 506 in reuse set $m_w$. Assignment component 512 can reassign user $n_w$ to a suitable reuse set, such that after the reassignment by assignment component 512, the throughput of user device $n_w$ exhibits a highest level of throughput improvement with regard to other user devices 506. User devices 506 in reuse set $m_w$ will also exhibit higher throughput due to improved average channel quality and one less user device, $n_w$, to compete for the resources in frequency reuse set $m_w$.

In determining an appropriate reassignment for user device $n_w$, restrictive reuse component 502 can identify a reuse set $m_d$ in which user device $n_w$ can achieve a maximum throughput. If restrictive reuse component 502 determines that $m_w$ is the optimal reuse set, then no reassignment need be made by assignment component 512. If $m_w$ is determined not to be optimal, then assignment component 512 can reassign user device $n_w$ to reuse set $m_d$ to improve throughput. restrictive reuse component 502 can then perform further iterations of the algorithm (e.g., computing estimated user device throughput over each reuse set, etc.) until throughput for all user devices 506 over all reuse sets is optimized.

Additionally, user device 506 throughputs in all reuse sets can be equalized by iteratively reassigning user devices 506 from a low throughput reuse sets to high throughput reuse sets. Restrictive reuse component 502 and can further improve device throughput by swapping user devices 506 between reuse sets if the restrictive reuse component determines that throughput for both reuse sets with be improved, rather than reassigning one user device from a low throughput reuse set to a high throughput reuse set in each iteration.

Figure 6:
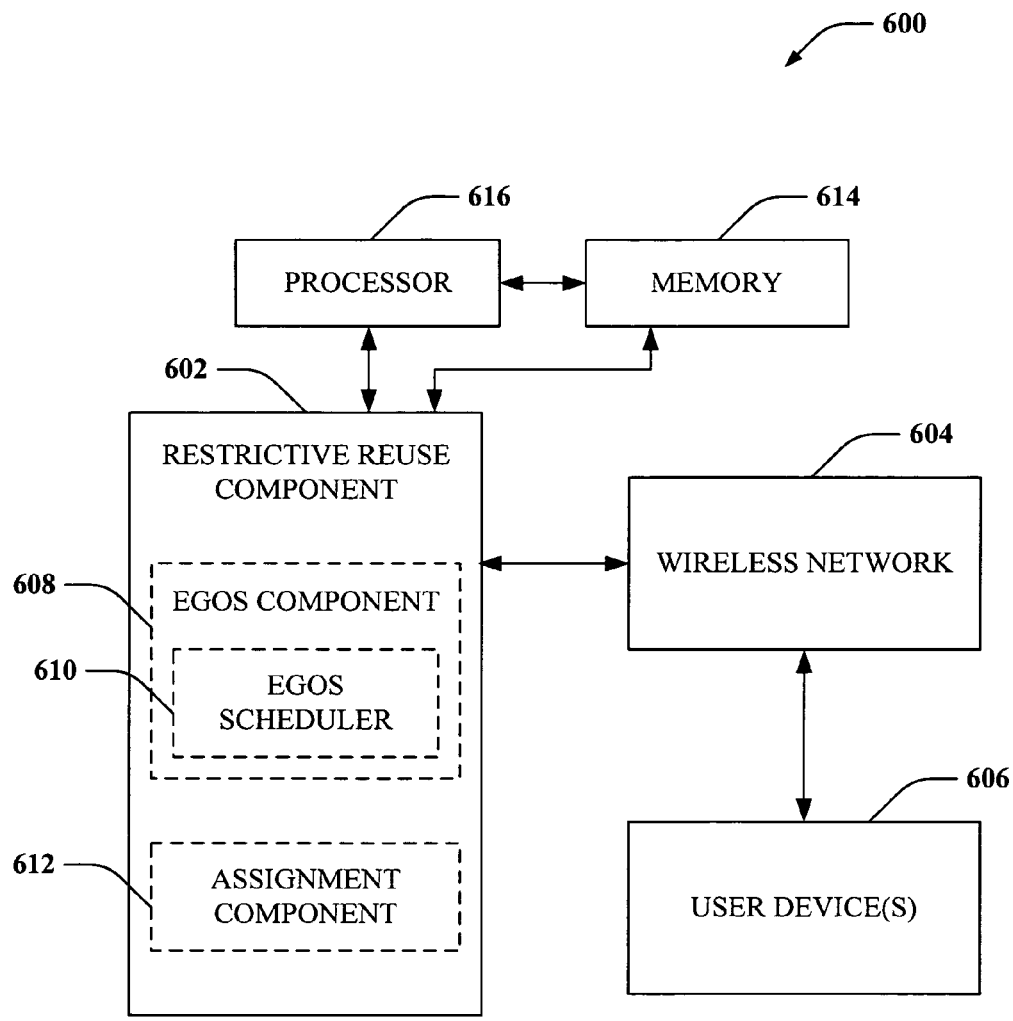
FIG. 6 illustrates a system that facilitates reassigning user devices to frequency reuse sets in a wireless network environment to optimize user device throughput in accordance with various aspects.

FIG. 6 illustrates a system 600 that facilitates reassigning user devices to frequency reuse sets in a wireless network environment to optimize user device throughput in accordance with various aspects. System 600 comprises an restrictive reuse component 602 that utilizes an restrictive reuse set management algorithm to reassign user devices 606 from reuse sets with relatively low throughput to reuse sets with reuse sets having higher throughput, in order to improve overall communications throughput in a wireless network 604. Restrictive reuse component 602 comprises an EGoS component 608 having a plurality of EGoS schedulers 610 that ensure fairness in resource allocation between user devices 606 within a particular frequency reuse set, and an assignment component 612 that reassigns user devices 606 to new reuse sets upon a determination that reassignment will improve user device throughput, as detailed with regard to the preceding figures.

System 600 can additionally comprise memory 614 that is operatively coupled to restrictive reuse component 602 and that stores information related to user device assignments, reuse set availability, user device throughput, etc, and any other suitable information related to improving communication signal throughput for one or more user devices. A processor 616 can be operatively connected to restrictive reuse component 602 (and/or memory 614) to facilitate analysis of information related to user device throughput, reuse set assignment, and the like. It is to be appreciated that processor 616 can be a processor dedicated to analyzing and/or generating information received by restrictive reuse component 602, a processor that controls one or more components of system 600, and/or a processor that both analyzes and generates information received by restrictive reuse component 602 and controls one or more components of system 600.

Memory 614 can additionally store protocols associated with generating user device 606 assignments and/or reassignments, etc., such that system 600 can employ stored protocols and/or algorithms to achieve user device throughput optimization as described herein. It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 614 of the subject systems and methods is intended to comprise, without being limited to, these and any other suitable types of memory.

Figure 7:
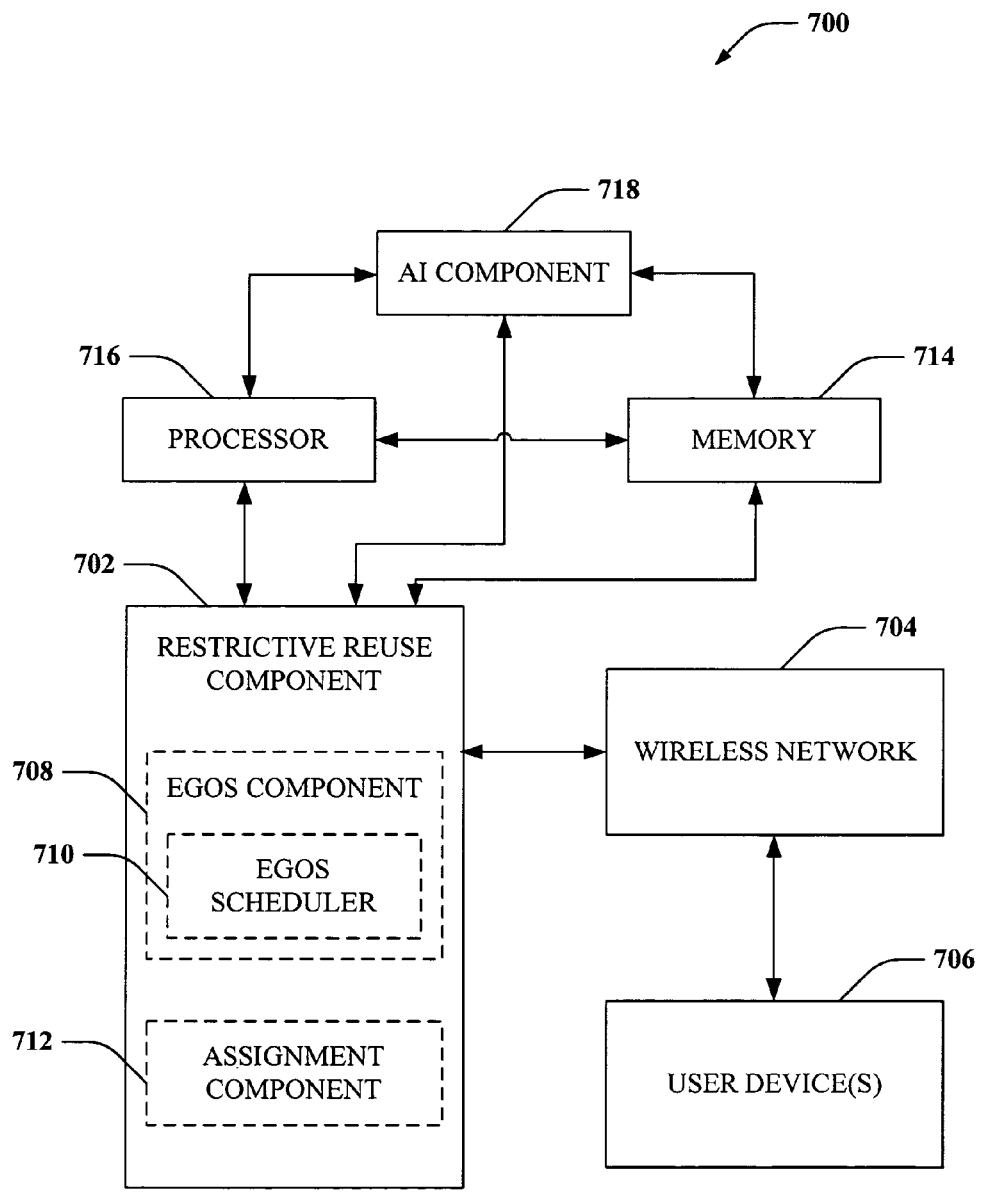
FIG. 7 is an illustration of a system that facilitates communication throughput optimization for user devices in a wireless network environment by enforcing EGoS fairness and providing dynamic reassignment of orthogonal resource reuse sets, in accordance with various aspects.

FIG. 7 is an illustration of a system 700 that facilitates communication throughput optimization for user devices in a wireless network environment by enforcing EGoS fairness and providing dynamic reassignment of orthogonal frequency reuse sets. System 700 comprises an restrictive reuse component 702 that can employ an frequency reuse set management algorithm to reassign user devices 706 between frequency reuse sets to improve communications throughput in a wireless network 704. Restrictive reuse component 702 comprises an EGoS component 708 that has a plurality of EGoS schedulers 710, each of which can ensure fairness in resource allocation between user devices 706 within a respective frequency reuse set for which a given EGoS scheduler 710 is responsible. Restrictive reuse component 702 further comprises an assignment component 702 that reassigns user devices 706 to new reuse sets based upon a determination that reassignment will improve user device throughput, as detailed with regard to the preceding figures.

System 700 can additionally comprises a memory 714 and a processor 716 as detailed above with regard to FIG. 6. Moreover, an AI component 718 can be operatively associated with assignment component 712 and can make inferences regarding reassignment of user devices 706, frequency reuse set availability, throughput optimization, etc. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, AI component 718 can infer an appropriate frequency reuse set to which a user device 706 can be assigned to improve throughput of the user device 706, based at least in part on, for instance, reuse set availability information, throughput associated with reuse sets, and the like. According to this example, it can be determined that a first reuse set has a low throughput as compared to one or more other reuse sets in a sector of wireless network 704. AI component 718, in conjunction with processor 716 and/or memory 714, can determine that reassignment of a given user device 706 to a reuse set that exhibits better throughput can benefit all user devices 706. AI component 718 can infer that a reassignment of the low-throughput user device to a high-throughput reuse set will provide better resource availability to the user device being reassigned, as well as passively improving throughput for other user devices assigned to the low-throughput reuse set because there will be one fewer device to compete for resources therein after reassignment. In such a case, AI component 718 can facilitate user device reassignment in the most efficient manner possible to mitigate network communication costs while improving user device communication throughput.

According to a related example, AI component 718 can determine that two user devices in two separate reuse sets are exhibiting poor throughput relative to other user devices. In this case, AI component 718 can infer that a swapping such user devices between reuse sets is most efficient. AI component 718 can facilitate such a swap based on optimization inferences that doing so will improve throughput in both reuse sets. It will be appreciated that the foregoing examples are illustrative in nature and are not intended to limit the scope of inferences that can be made by the AI component 718 or the manner in which the AI component 718 makes such inferences.

Figure 8:
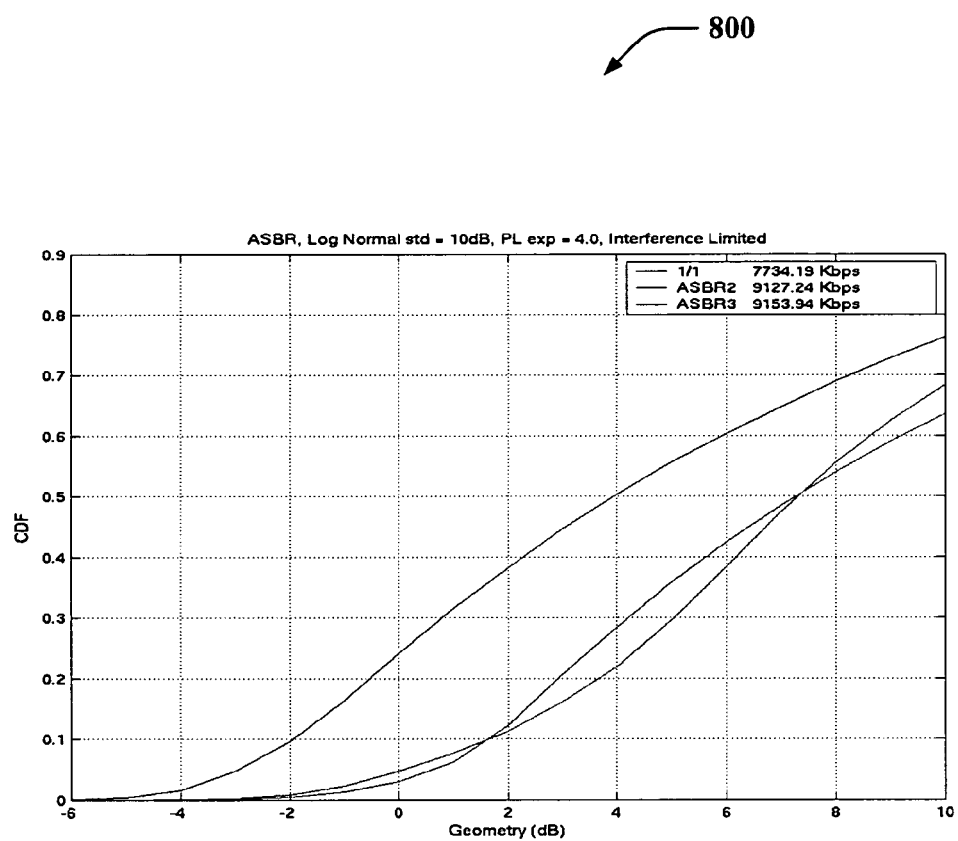
FIG. 8 illustrates a graph that facilitates understanding of the effects of resource reuse set management in a wireless network environment, such as an OFDMA system, in accordance with various aspects.

FIG. 8 illustrates a graph 800 that facilitates understanding of the effects of orthogonal resource reuse set management in a wireless network environment, such as an OFDMA system. Average SINR, with and without reuse set management as detailed herein, are depicted. "ASBR2" and "ASBR3" refer to restrictive reuse algorithms with maximum active reuse set sizes of 2 and 3, respectively, although other set sizes are possible, as will be appreciated by one skilled in the art. As illustrated, with anticipated 25% partial loading and using a reuse set size of 3, the distribution is uniformly shifted 3.5 dB to the right. Mean spectral efficiency can be improved by approximately 57%, while estimated throughput is improved by approximately 18%, in view of 25% partial loading. Thus, it can be seen that the systems and methods described herein facilitate substantially improving user device throughput by utilizing an frequency reuse set management algorithm to dynamically reassign user devices to new reuse sets.

Figure 9:
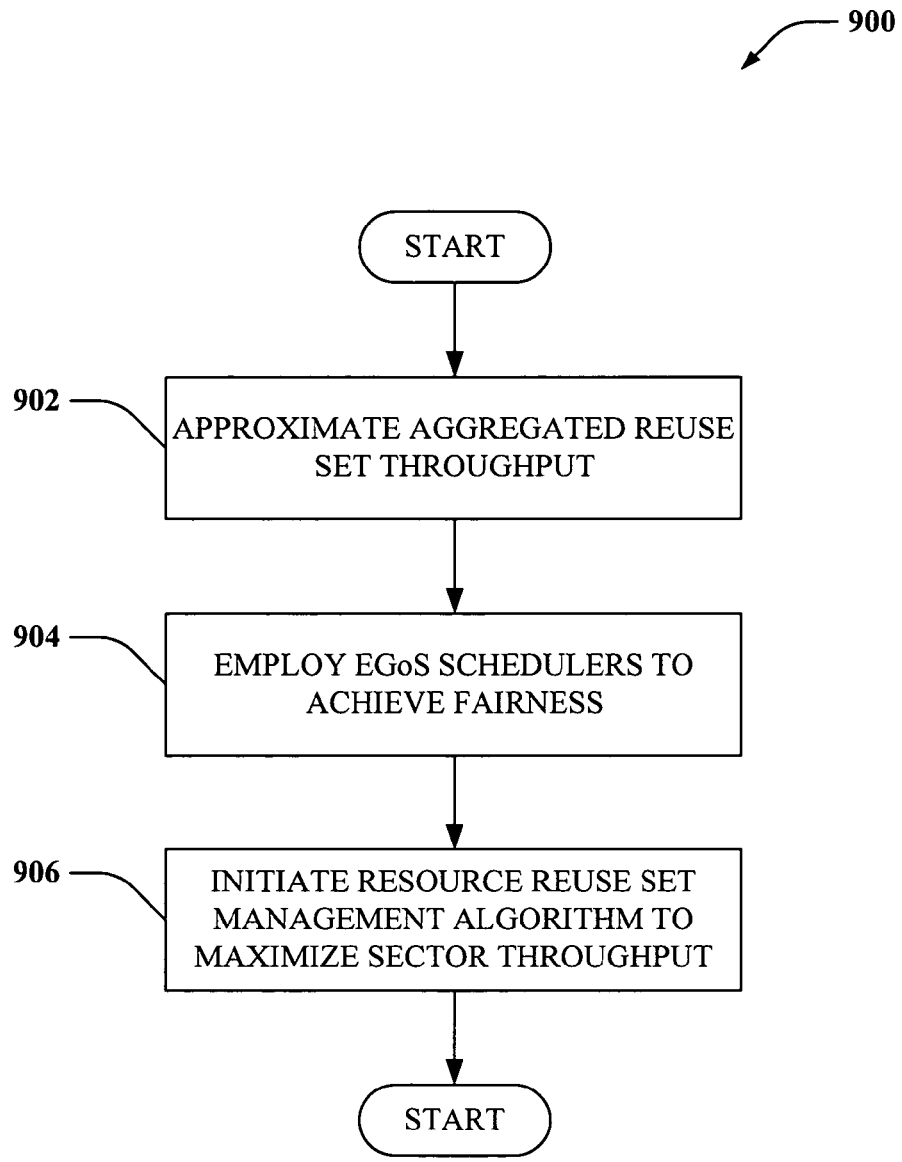
FIG. 9 illustrates a methodology for optimizing user device throughput in a wireless network according to one or more embodiments.
Figure 10:
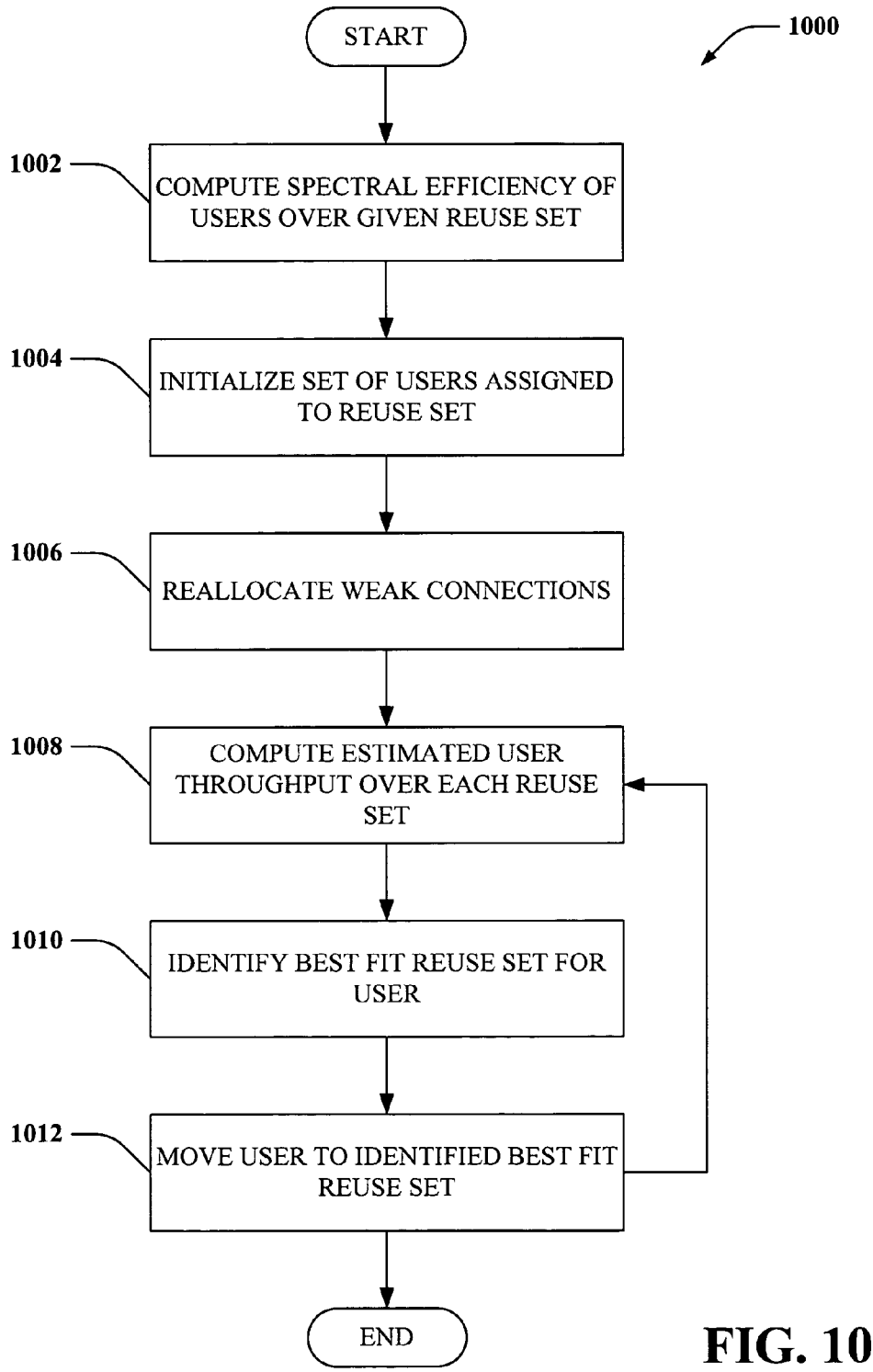
FIG. 10 illustrates a methodology for user device communication optimization utilizing a restrictive reuse set management algorithm in accordance with various aspects described herein.
Figure 11:
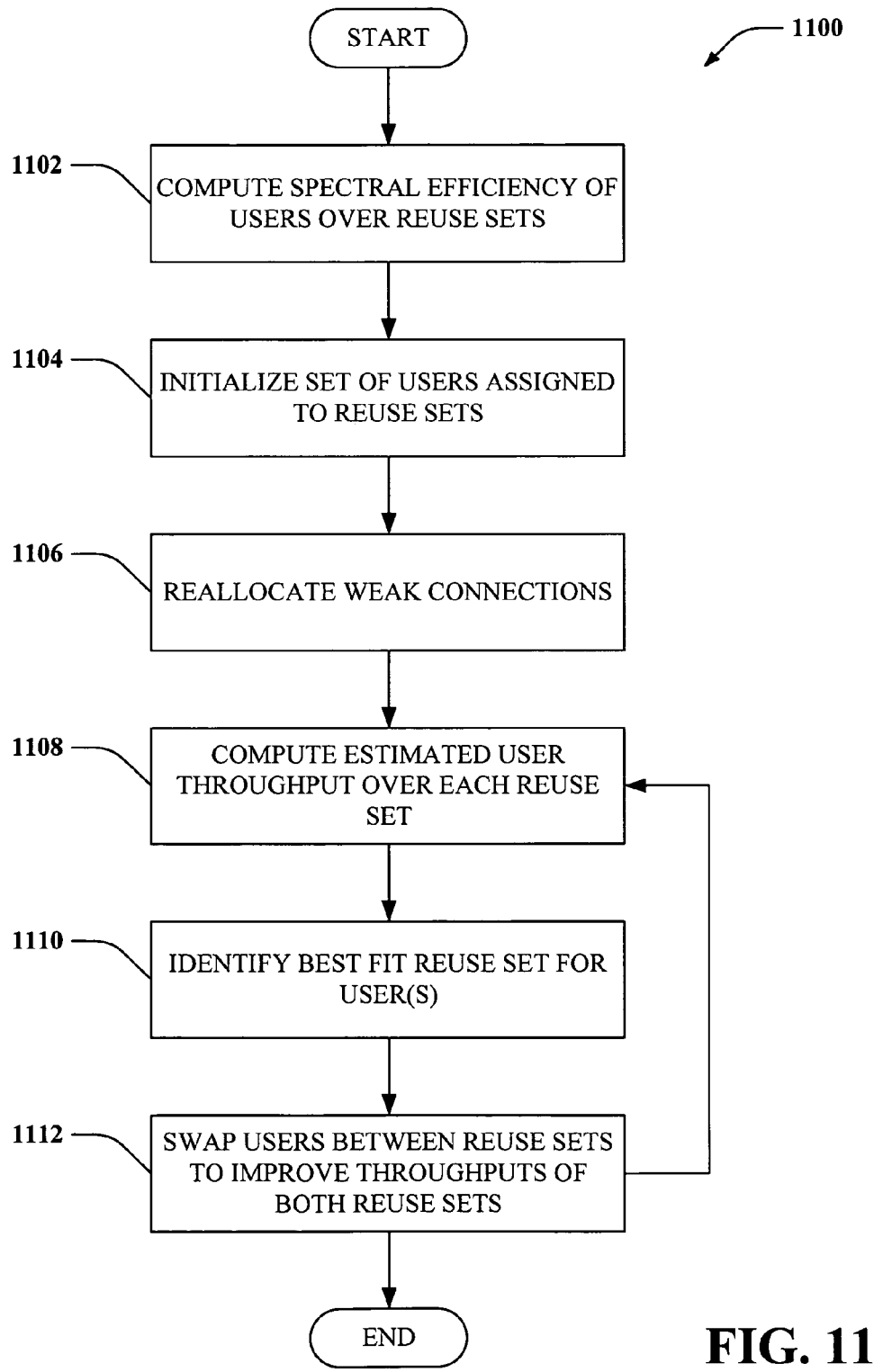
FIG. 11 is an illustration of a methodology for improving user device throughput in a wireless network by swapping user device assignments between orthogonal resource reuse sets upon a determination that communication throughput will be improved as a result of the device reassignments, in accordance with various aspects.

Referring to FIGS. 9-11, methodologies relating to generating supplemental system resource assignments are illustrated. For example, methodologies can relate to frequency reuse set management in an OFDM environment, an OFDMA environment, a CDMA environment, a TDMA environment, or any other suitable wireless environment. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

FIG. 9 illustrates a methodology 900 for optimizing user device throughput in a wireless network according to one or more embodiments. At 902, aggregated reuse set throughput can be approximated by determining the product of the harmonic mean of user device spectral efficiency and the bandwidth allocated to a given reuse set. Such through put can be based at least in part on fairness metrics, channel desirability metrics, and the like, as described with regard to preceding figures. For example, in a case where there are N active users and M available reuse sets in a sector, $\mu_{n,m}$ can denote the spectral efficiency of user n over reuse set m. $S_m$ can denote the set of users assigned to reuse set m, where set 0 denotes a 1/1 reuse set. $B_m$ can denote the bandwidth allocated to reuse set m. EGoS sector throughput can be approximated by:

$$B_m \frac{|S_m|}{\sum_{i \in S_m} 1/\mu_{i,m}},$$

where |.| denotes the size of a given reuse set. Estimated user throughput over reuse set m is then given by:

$$\eta_m = \frac{B_m}{\sum_{i \in S_m} 1/\mu_{i,m}}. \tag{8}$$

Reuse set memberships can be allocated to maximize sector throughput under the constraint that the same user device throughput is achieved over all reuse sets.

At 904, EGoS schedulers can be employed to ensure fairness constraints are adhered to such that all user devices in a given reuse set are provided substantially equal grades of service. At 906, a restrictive reuse set management algorithm can be employed as detailed below with regard to FIGS. 10 and 11. In this manner, an EGoS algorithm can be employed to ensure optimization of user device throughput between users within a reuse set, while a restrictive reuse set management algorithm can be utilized to facilitate ensuring throughput is optimized between reuse sets themselves.

FIG. 10 illustrates a methodology 1000 for user device communication optimization utilizing a restrictive reuse set management algorithm in accordance with various aspects described herein. At 1002, spectral efficiency for user devices assigned to a given reuse set can be computed, such that $\mu_{n,m}$ for n=[1 . . . N] and m=[1 . . . M], where n is the number of user devices and m is the number of available reuse sets. At 1004, reuse set $S_0$ can be initialized with the set {1 . . . N} and other reuse sets $S_m$ can be initialized with empty sets. At 1006, user devices with the weakest M−1 connections (e.g., devices with connections exhibiting the smallest spectral efficiency $\mu_{n,0}$), can be reassigned from set $S_0$ to the other M−1 sets, where each set has a single user device connection.

Estimated user throughput over each reuse set can be determined, at 1008, according to equation (8), assuming an independent EGoS scheduler is implemented over each set to ensure intra-set fairness among user devices. Several assumptions can be made to facilitate estimation of user throughput over each reuse set at 1008. For instance, $m_w$ can denote the index of the reuse set with lowest user throughput $\eta_m$. Additionally, $n_w$ can denote the index of the weakest user (e.g., the user device with lowest spectral efficiency) in reuse set $m_w$. At 1010, a reuse set $m_d$ in which user $n_w$ can achieve the highest throughput can be identified. At 1012, user $n_w$ can be reassigned from reuse set $S_{m_w}$ to reuse set $S_{m_d}$. In the event that the original set $m_w$ is the best reuse set for user device $n_w$, then no reassignment need take place. Method 1000 can then revert to 1008 for further iterations of user device assessment and reassignment in order to facilitate continuously updating user device assignments in a dynamically changing wireless networking environment. Additionally, user throughputs in all reuse sets are thus equalized by iteratively reassigning users from low throughput reuse sets to high throughput reuse sets.

FIG. 11 is an illustration of a methodology 1100 for improving user device throughput in a wireless network by swapping user device assignments between frequency reuse sets upon a determination that communication throughput will be improved as a result of the device reassignments. At 1102, spectral efficiency for user devices assigned to a one or more reuse sets can be computed, such that $\mu_{n,m}$ for n=[1 . . .

N] and m=[1 ... M], where n is the number of user devices and m is the number of available reuse sets. At 1104, a first reuse set, $S_0$, can be initialized with the set {1 ... N}, and other reuse sets $S_m$ can be initialized with empty sets. At 1106, user devices with the weakest M−1 connections (e.g., devices with connections exhibiting the smallest spectral efficiency $\mu_{n,0}$ relative to other devices), can be reassigned from set $S_0$ to the other M−1 sets, where each set has a single user device connection.

At 1108, user device throughput over each reuse set can be estimated according to equation (8), where an independent EGoS scheduler is implemented over each set to ensure intra-set fairness among user devices. For instance, $m_w$ can denote the index of the reuse set with lowest user device throughput $\eta_m$. Additionally, $n_w$ can denote the index of the weakest user (e.g., the user device with lowest spectral efficiency) in reuse set $m_w$. At 1110, a reuse set $m_d$ in which user device n can achieve the highest throughput can be identified. Acts 1104 through 1110 can be reiterated for at least a second reuse set, $S_1$, such that $S_1$ is provides a best fit for the weakest user device of $S_0$, while $S_0$ provides a best fit for the weakest device of $S_1$. At 1112, user devices $n_w$ for reuse sets $S_0$ and $S_1$ can be exchanged between reassigned from reuse sets $S_0$ and $S_1$. Method 1100 can then revert to 1108 for further iterations of user device assessment and reassignment in order to facilitate continuously updating user device assignments in a dynamically changing wireless networking environment.

It will be appreciated that the restrictive reuse set management algorithms described with regard to FIGS. 9-11 can be based on long-term channel quality measurements. Although short-term fading can cause large variation in user device spectral efficiency over time, the difference in a user's spectral efficiencies between two reuse sets can be a much slower random process when compared with short-term fading. Additionally, restrictive reuse set membership updating intervals can be set to an active set updating interval, as in conventional CDMA systems, in order to facilitate achieving the desired throughput optimization described herein.

Figure 12:
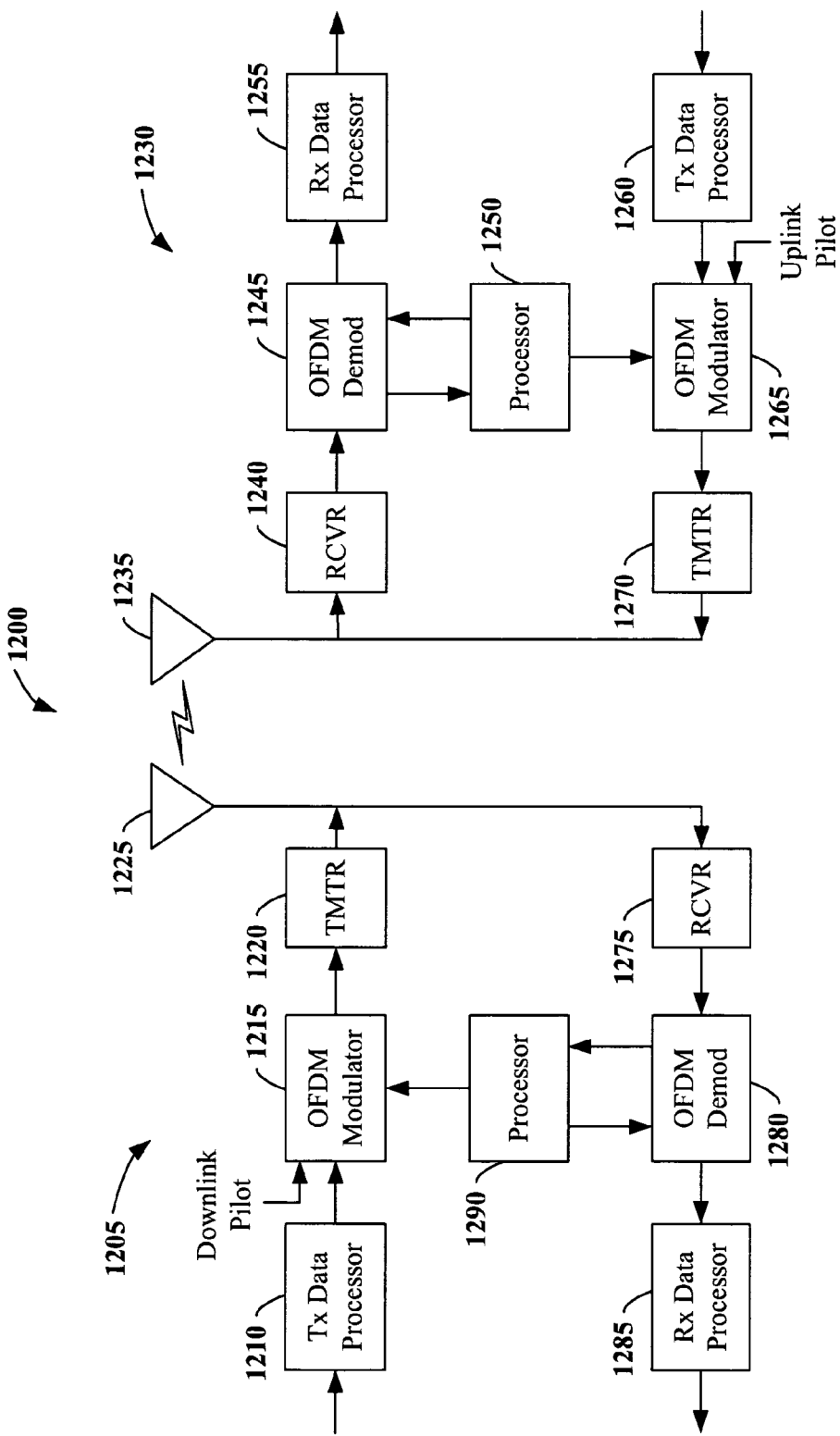
FIG. 12 is an illustration of a wireless network environment that can be employed in conjunction with the various systems and methods described herein.

FIG. 12 shows an exemplary wireless communication system 1200. The wireless communication system 1200 depicts one base station and one terminal for sake of brevity. However, it is to be appreciated that the system can include more than one base station and/or more than one terminal, wherein additional base stations and/or terminals can be substantially similar or different for the exemplary base station and terminal described below. In addition, it is to be appreciated that the base station and/or the terminal can employ the systems (FIGS. 1-7) and/or methods (FIGS. 9-11) described herein to facilitate wireless communication there between.

Referring now to FIG. 12, on a downlink, at access point 1205, a transmit (TX) data processor 1210 receives, formats, codes, interleaves, and modulates (or symbol maps) traffic data and provides modulation symbols ("data symbols"). An OFDM modulator 1215 receives and processes the data symbols and pilot symbols and provides a stream of OFDM symbols. An OFDM modulator 1220 multiplexes data and pilot symbols on the proper subbands, provides a signal value of zero for each unused subband, and obtains a set of N transmit symbols for the N subbands for each OFDM symbol period. Each transmit symbol may be a data symbol, a pilot symbol, or a signal value of zero. The pilot symbols may be sent continuously in each OFDM symbol period. Alternatively, the pilot symbols may be time division multiplexed (TDM), frequency division multiplexed (FDM), or code division multiplexed (CDM). OFDM modulator 1220 can transform each set of N transmit symbols to the time domain using an N-point IFFT to obtain a "transformed" symbol that contains N time-domain chips. OFDM modulator 1220 typically repeats a portion of each transformed symbol to obtain a corresponding OFDM symbol. The repeated portion is known as a cyclic prefix and is used to combat delay spread in the wireless channel.

A transmitter unit (TMTR) 1220 receives and converts the stream of OFDM symbols into one or more analog signals and further conditions (e.g., amplifies, filters, and frequency upconverts) the analog signals to generate a downlink signal suitable for transmission over the wireless channel. The downlink signal is then transmitted through an antenna 1225 to the terminals. At terminal 1230, an antenna 1235 receives the downlink signal and provides a received signal to a receiver unit (RCVR) 1240. Receiver unit 1240 conditions (e.g., filters, amplifies, and frequency downconverts) the received signal and digitizes the conditioned signal to obtain samples. An OFDM demodulator 1245 removes the cyclic prefix appended to each OFDM symbol, transforms each received transformed symbol to the frequency domain using an N-point FFT, obtains N received symbols for the N subbands for each OFDM symbol period, and provides received pilot symbols to a processor 1250 for channel estimation. OFDM demodulator 1245 further receives a frequency response estimate for the downlink from processor 1250, performs data demodulation on the received data symbols to obtain data symbol estimates (which are estimates of the transmitted data symbols), and provides the data symbol estimates to an RX data processor 1255, which demodulates (i.e., symbol demaps), deinterleaves, and decodes the data symbol estimates to recover the transmitted traffic data. The processing by OFDM demodulator 1245 and RX data processor 1255 is complementary to the processing by OFDM modulator 1215 and TX data processor 1210, respectively, at access point 1200.

On the uplink, a TX data processor 1260 processes traffic data and provides data symbols. An OFDM modulator 1265 receives and multiplexes the data symbols with pilot symbols, performs OFDM modulation, and provides a stream of OFDM symbols. The pilot symbols may be transmitted on subbands that have been assigned to terminal 1230 for pilot transmission, where the number of pilot subbands for the uplink may be the same or different from the number of pilot subbands for the downlink. A transmitter unit 1270 then receives and processes the stream of OFDM symbols to generate an uplink signal, which is transmitted by the antenna 1235 to the access point 1210.

At access point 1210, the uplink signal from terminal 1230 is received by the antenna 1225 and processed by a receiver unit 1275 to obtain samples. An OFDM demodulator 1280 then processes the samples and provides received pilot symbols and data symbol estimates for the uplink. An RX data processor 1285 processes the data symbol estimates to recover the traffic data transmitted by terminal 1235. A processor 1290 performs channel estimation for each active terminal transmitting on the uplink. Multiple terminals may transmit pilot concurrently on the uplink on their respective assigned sets of pilot subbands, where the pilot subband sets may be interlaced.

Processors 1290 and 1250 direct (e.g., control, coordinate, manage, etc.) operation at access point 1210 and terminal 1235, respectively. Respective processors 1290 and 1250 can be associated with memory units (not shown) that store program codes and data. Processors 1290 and 1250 can also perform computations to derive frequency and impulse response estimates for the uplink and downlink, respectively.

For a multiple-access OFDM system (e.g., an orthogonal frequency division multiple-access (OFDMA) system), multiple terminals may transmit concurrently on the uplink. For such a system, the pilot subbands may be shared among different terminals. The channel estimation techniques may be used in cases where the pilot subbands for each terminal span the entire operating band (possibly except for the band edges). Such a pilot subband structure would be desirable to obtain frequency diversity for each terminal. The techniques described herein may be implemented by various means. For example, these techniques may be implemented in hardware, software, or a combination thereof. For a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors 1290 and 1250.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of optimizing signal transmission throughput in a wireless network, comprising:
    approximating aggregated throughput of orthogonal resource reuse sets based on an evaluation of spectral efficiency;
    employing one or more equal grade of service (EGoS) schedulers or proportional fairness schedulers to enforce fairness constraints for orthogonal resource allocation to at least one user device within each orthogonal resource reuse set;
    scheduling the at least one user device according to the fairness constraints by employing a scheduling metric based on a fairness metric and a channel desirability metric; and
    employing a restrictive reuse set management algorithm to enforce fairness constraints for orthogonal resource allocation between orthogonal resource reuse sets.

2. The method of claim 1, wherein approximating aggregated throughput of orthogonal resource reuse sets comprises determining the spectral efficiency of user devices in orthogonal resource reuse sets.

3. The method of claim 2, further comprising initializing a set of user devices for a first orthogonal resource reuse set.

4. The method of claim 3, further comprising reallocating user devices with low spectral efficiency from the first orthogonal resource reuse set to a second orthogonal resource reuse set with a higher throughput than the first orthogonal resource reuse set.

5. The method of claim 2, further comprising estimating throughput for each orthogonal resource reuse set in a wireless network sector.

6. The method of claim 5, further comprising identifying an orthogonal resource reuse set with a highest throughput relative to all other orthogonal resource reuse sets in the sector.

7. The method of claim 6, further comprising reassigning a user device having a lowest spectral efficiency relative to other user devices to the identified orthogonal resource reuse set.

8. The method of claim 7, further comprising iterating the method for all user devices in all orthogonal resource reuse sets.

9. The method of claim 2, further comprising exchanging two user devices of low spectral frequency between two orthogonal resource reuse sets of high throughput upon a determination that the spectral efficiency of both user devices will be improved by the exchange.

10. The method of claim 1, wherein the orthogonal resource reuse sets comprise at least one of frequency sets, time slot sets, frequency-and-time slot sets, code sets, orthogonal space-division multiple access (SDMA) dimensions, and carrier sets.

11. The method of claim 1, wherein the orthogonal resource reuse sets are frequency sets comprising at least one of orthogonal frequency division multiple access (OFDMA) subcarrier sets, interleaved frequency division multiple access (IFDMA) subcarrier sets, and localized frequency division multiple access (LFDMA) subcarrier sets.

12. An apparatus that facilitates optimizing user device throughput in a wireless network environment, comprising:
    a restrictive reuse component that approximates aggregated throughput of orthogonal resource reuse sets based on an evaluation of spectral efficiency of user devices in a wireless network and that enforces fairness constraints for orthogonal resource allocation between orthogonal resource reuse sets; and
    one or more equal grade of service (EGoS) schedulers that enforce fairness constraints for orthogonal resource allocation to at least one user device within each orthogonal resource reuse set,
    wherein the EGoS schedulers enforce the fairness constraints in accordance with a scheduling metric based on a fairness metric and a channel desirability metric.

13. The apparatus of claim 12, wherein each orthogonal resource reuse set is governed by one of the EGoS schedulers assigned to the orthogonal resource reuse set.

14. The apparatus of claim 12, further comprising an assignment component that assigns user devices to orthogonal resource reuse sets and reassigns user devices between orthogonal resource reuse sets to improve overall throughput in the wireless network.

15. The apparatus of claim 14, wherein the restrictive reuse component identifies a user device with a lowest spectral efficiency relative to other user devices.

16. The apparatus of claim 15, wherein the restrictive reuse component identifies an orthogonal resource reuse set in which the identified user device can achieve a greatest improvement in spectral efficiency.

17. The apparatus of claim 16, wherein the assignment component reassigns the identified user device to the identified orthogonal resource reuse set to improve throughput of the identified user device.

18. The apparatus of claim 16, wherein the restrictive reuse component approximates orthogonal resource reuse set throughput based at least in part on the spectral efficiency of all user devices assigned to the identified orthogonal resource reuse set.

19. The apparatus of claim 18, wherein the restrictive reuse component initializes a first orthogonal resource reuse set comprising a first set of user devices.

20. The apparatus of claim 19, wherein the restrictive reuse component initializes one or more empty orthogonal resource reuse sets with no user devices assigned.

21. The apparatus of claim 20, wherein the assignment component reassigns user devices having low spectral efficiency relative to other user devices to the one or more empty orthogonal resource reuse sets such that each of the empty orthogonal resource reuse sets will have one user device assignment.

22. The apparatus of claim 21, wherein the restrictive reuse component identifies a second orthogonal resource reuse set exhibiting high throughput to which the user device with lowest spectral efficiency can be assigned.

23. The apparatus of claim 22, wherein the assignment component reassigns the user device with lowest spectral efficiency to the second orthogonal resource reuse set to improve throughput of the user device.

24. The apparatus of claim 12, wherein the orthogonal resource reuse sets comprise at least one of frequency sets, time slot sets, frequency-and-time slot sets, code sets, orthogonal space-division multiple access (SDMA) dimensions, and carrier sets.

25. The apparatus of claim 12, wherein the orthogonal resource reuse sets are frequency sets comprising at least one of orthogonal frequency division multiple access (OFDMA) subcarrier sets, interleaved frequency division multiple access (IFDMA) subcarrier sets, and localized frequency division multiple access (LFDMA) subcarrier sets.

26. An apparatus that facilitates improving spectral efficiency of user devices in a wireless network, comprising:
means for approximating aggregated throughput of orthogonal resource reuse sets by based on an evaluation of spectral efficiency and the orthogonal resource reuse sets;
means for enforcing fairness constraints related to resource allocation to user devices within a orthogonal resource reuse set in a wireless network; and
means for enforcing fairness constraints related to resource allocation to one or more orthogonal resource reuse sets in the wireless network,
wherein the fairness constraints are employed to enforce at least one of an equal grade of service (EGoS) or proportional fairness based on a fairness metric and a channel desirability metric.

27. The apparatus of claim 26, further comprising means for assigning user devices to an orthogonal resource reuse set.

28. The apparatus of claim 27, further comprising means for evaluating spectral efficiency of one or more user devices.

29. The apparatus of claim 28, further comprising means for identifying an orthogonal resource reuse set in which a user device can experience improved spectral efficiency.

30. The apparatus of claim 29, wherein the means for assigning user devices reassigns a user device with low spectral efficiency to the identified orthogonal resource reuse set to improve the spectral efficiency of the reassigned user device.

31. The apparatus of claim 26, wherein the means for enforcing fairness constraints related to resource allocation to user devices comprises one or more EGoS schedulers.

32. The apparatus of claim 31, wherein each orthogonal resource reuse set is assigned an EGoS scheduler to ensure that user devices in the orthogonal resource reuse set are allocated resources according to EGoS fairness criteria.

33. The apparatus of claim 26, wherein the orthogonal resource reuse sets comprise at least one of frequency sets, time slot sets, frequency-and-time slot sets, code sets, orthogonal space-division multiple access (SDMA) dimensions, and carrier sets.

34. The apparatus of claim 26, wherein the orthogonal resource reuse sets are frequency sets comprising at least one of orthogonal frequency division multiple access (OFDMA) subcarrier sets, interleaved frequency division multiple access (IFDMA) subcarrier sets, and localized frequency division multiple access (LFDMA) subcarrier sets.

35. A non-transitory computer-readable medium having stored thereon computer-executable instructions for:
approximating aggregated throughput of orthogonal resource reuse sets based on an evaluation of spectral efficiency and the orthogonal resource reuse sets in a wireless network;
distributing orthogonal resources to one or more user devices associated with an orthogonal resource reuse set according to an equal grade of service (EGoS) protocol to enforce constraints for orthogonal resource allocation to the one or more user devices within each orthogonal resource reuse set, wherein the EGoS protocol employs one or more fairness constraints that include at least a fairness metric and a channel desirability metric; and
employing a restrictive reuse set management algorithm to enforce constraints for orthogonal resource allocation between orthogonal resource reuse sets.

36. The non-transitory computer-readable medium of claim 35, further comprising instructions for evaluating spectral efficiency for at least one user device in the wireless network.

37. The non-transitory computer-readable medium of claim 36, further comprising instructions for identifying a user device having a lowest spectral efficiency relative to all other user devices.

38. The non-transitory computer-readable medium of claim 37, further comprising instructions for identifying an orthogonal resource reuse set with a highest overall throughput relative to other orthogonal resource reuse sets in the wireless network.

39. The non-transitory computer-readable medium of claim 38, further comprising instructions for reassigning the user device having the lowest spectral efficiency to the orthogonal resource reuse set with the highest overall throughput to improve spectral efficiency of the user device.

40. The non-transitory computer-readable medium of claim 39 further comprising instructions for continuously evaluating user device spectral efficiency and orthogonal resource reuse set throughput to permit continuous reassignment of user devices with poor spectral efficiency to orthogonal resource reuse sets with high throughput.

41. A processor that executes instructions embodied on a computer readable medium for optimizing throughput in a wireless communication environment, the instructions comprising:
assessing throughput for one or more user devices communicating in at least a portion of a wireless network;
evaluating sector throughput for one or more orthogonal resource sets in the portion of the wireless network;
identifying a user device with relatively low throughput compared to other user devices; and
reassigning the user device from a first orthogonal resource set to a second orthogonal resource set of higher throughput than the first orthogonal resource set, wherein reassigning the user device is based on at least a channel desirability metric that varies inversely with an average spectral efficiency.

42. The processor of claim 41, the instructions further comprising employing equal grade of service fairness constraints within orthogonal resource sets.

43. The processor of claim 41, wherein the orthogonal resource sets comprise at least one of frequency sets, time slot sets, frequency-and-time slot sets, code sets, orthogonal space-division multiple access (SDMA) dimensions, and carrier sets.

44. The processor of claim 41, wherein the orthogonal resource sets are frequency sets comprising at least one of orthogonal frequency division multiple access (OFDMA) subcarrier sets, interleaved frequency division multiple access (IFDMA) subcarrier sets, and localized frequency division multiple access (LFDMA) subcarrier sets.

45. A mobile device that facilitates communicating over a wireless network, comprising:
 a component that receives an orthogonal resource reuse set assignment, wherein the assignment is based on fairness constraints for dynamic allocation of orthogonal resources and an approximation of aggregated throughput of orthogonal resource reuse sets based on an evaluation of spectral efficiency; and
 a component that establishes control over resources allocated by the orthogonal resource reuse set assignment,
 wherein the fairness constraints are used to enforce an equal grade of service (EGoS) or proportional fairness based on a fairness metric and a channel desirability metric, and wherein the fairness constraints include constraints for orthogonal resource assignment within each orthogonal resource reuse set and orthogonal resource assignment between orthogonal resource reuse sets.

46. The mobile device of claim 45, wherein the device is at least one of a cellular phone, a smart phone, a laptop, a PDA, a handheld communication device, a handheld computing device, a satellite radio, and a global positioning system.

47. The mobile device of claim 45, wherein the orthogonal resource sets comprise at least one of frequency sets, time slot sets, frequency-and-time slot sets, code sets, orthogonal space-division multiple access (SDMA) dimensions, and carrier sets.

48. The mobile device of claim 45, wherein the orthogonal resource sets are frequency sets comprising at least one of orthogonal frequency division multiple access (OFDMA) subcarrier sets, interleaved frequency division multiple access (IFDMA) subcarrier sets, and localized frequency division multiple access (LFDMA) subcarrier sets.

49. A method of optimizing signal transmission throughput in a wireless network where signals are time-multiplexed, comprising:
 approximating aggregated throughput of orthogonal resource reuse sets based on an evaluation of spectral efficiency and the orthogonal resource reuse sets;
 employing one or more equal grade of fairness (EGoS) schedulers or proportional fairness schedulers to enforce constraints for orthogonal resource allocation to at least one user device within each orthogonal resource reuse set;
 scheduling at least one user device according to the constraints by employing a scheduling metric based on a fairness metric and a channel desirability metric; and
 employing a restrictive reuse set management algorithm to enforce the constraints for orthogonal resource allocation between orthogonal resource reuse sets.

50. The method of claim 49, wherein the fairness metric varies inversely with throughput of the at least one user device over a specified window.

51. The method of claim 49, wherein the fairness metric varies with an average spectral efficiency of the at least one user device.

52. The method of claim 49, wherein the channel desirability metric varies with an instant spectral efficiency of the at least one user device.

53. The method of claim 49, wherein the channel desirability metric varies inversely with an average spectral efficiency of the at least one user device.

* * * * *